US008659614B2

(12) United States Patent
Koyama

(10) Patent No.: US 8,659,614 B2
(45) Date of Patent: Feb. 25, 2014

(54) IMAGE DISPLAY APPARATUS

(75) Inventor: Fumio Koyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 992 days.

(21) Appl. No.: 12/729,476

(22) Filed: Mar. 23, 2010

(65) Prior Publication Data

US 2010/0245379 A1 Sep. 30, 2010

(30) Foreign Application Priority Data

Mar. 26, 2009 (JP) ................................ 2009-075724

(51) Int. Cl.

| | |
|---|---|
| ***G09G 5/02*** | (2006.01) |
| ***G06K 9/00*** | (2006.01) |
| ***G06K 9/40*** | (2006.01) |
| ***H04N 7/01*** | (2006.01) |
| ***H04N 11/20*** | (2006.01) |
| ***H04N 9/65*** | (2006.01) |
| ***H04N 9/68*** | (2006.01) |
| ***H04N 9/64*** | (2006.01) |
| ***H04N 9/77*** | (2006.01) |

(52) U.S. Cl.
USPC .......... 345/589; 345/593; 345/594; 345/600; 345/604; 382/167; 382/274; 348/442; 348/453; 348/642; 348/645; 348/649; 348/712; 348/713

(58) Field of Classification Search
USPC ......... 345/589–605, 581, 619, 643–645, 440, 345/440.1, 440.2, 690; 358/518–523, 530; 382/162, 167, 254, 274, 276; 715/273, 715/275; 348/441, 442, 453, 455, 488, 489, 348/491, 492, 571, 642, 645–654, 662, 663, 348/708, 712, 713
See application file for complete search history.

(56) References Cited

U.S. PATENT DOCUMENTS

| | | | | |
|---|---|---|---|---|
| 5,754,316 | A | 5/1998 | Hayashi et al. | |
| 6,075,887 | A * | 6/2000 | Brett | 382/167 |
| 6,177,962 | B1 * | 1/2001 | Rumreich et al. | 348/648 |
| 6,734,899 | B1 | 5/2004 | Okamoto | |
| 7,961,257 | B2 | 6/2011 | Ogawa | |
| 2004/0017586 | A1 * | 1/2004 | Nichogi | 358/2.1 |
| 2007/0046688 | A1 * | 3/2007 | Gonsalves et al. | 345/589 |
| 2009/0297022 | A1 * | 12/2009 | Pettigrew et al. | 382/162 |

FOREIGN PATENT DOCUMENTS

| | | |
|---|---|---|
| JP | A-07-087345 | 3/1995 |
| JP | A-09-018724 | 1/1997 |
| JP | A-11-069186 | 3/1999 |
| JP | A-2005-284493 | 10/2005 |
| JP | A-2006-030998 | 2/2006 |
| JP | A-2007-096612 | 4/2007 |
| JP | A-2008-283375 | 11/2008 |

* cited by examiner

*Primary Examiner* — Wesner Sajous
*Assistant Examiner* — Andrew Shin
(74) *Attorney, Agent, or Firm* — Oliff PLC

(57) ABSTRACT

An image display apparatus adapted to display an image based on an image signal input includes: a color adjustment circuit adapted to perform one of a modification process and a correction process individually on a hue signal, a lightness signal, and a saturation signal included in first HLS signals as an image signal, and output the processed signals as second HLS signals.

5 Claims, 10 Drawing Sheets

| SIGNAL | SIGNAL VALUE RANGE |
|---|---|
| U | -511~511 |
| V | -511~511 |
| $U^2+V^2$ | 0~524287 |
| K | 0~2047 |
| L | -128~127 |
| Sr | 0~4095 |
| Si | -128~127 |
| S | 0~1023 |
| invSr | 0~2047 |
| Ur | 0~2047 |
| Vr | 0~2047 |
| Ph | 0~256 |
| H | 0~1023 |

FLOATING-POINT CALCULATION $R^2=K/2^L$

| $R^2$ | FIRST REAL VALUE K | SECOND INDEX VALUE L (EVEN NUMBER) | RECALCULATION RESULT | |
|---|---|---|---|---|
| 0 | 0 | 0 | | |
| 1 | 1024 | 10 | 1 | |
| 2 | 512 | 8 | 2 | |
| 3 | 768 | 8 | 3 | |
| 4 | 1024 | 8 | 4 | |
| 5 | 1280 | 8 | 5 | |
| 6 | 1536 | 8 | 6 | |
| 7 | 1792 | 8 | 7 | |
| 8 | 512 | 6 | 8 | |
| 9 | 576 | 6 | 9 | |
| 31 | 1984 | 6 | 31 | |
| 32 | 512 | 4 | 32 | |
| 33 | 528 | 4 | 33 | |
| 127 | 2032 | 4 | 127 | |
| 128 | 512 | 2 | 128 | |
| 512 | 512 | 0 | 512 | |
| 2048 | 512 | -2 | 2048 | |
| 8192 | 512 | -4 | 8192 | |
| 32768 | 512 | -6 | 32768 | |
| 131072 | 512 | -8 | 131072 | |
| 262121 | 1023.910156 | -8 | 262121 | =511*511 |

FIG. 5

| | U | V | (Ph) DEGREE | H |
|---|---|---|---|---|
| FIRST QUADRANT | + | 0 | 0 | H=Ph |
| FIRST QUADRANT | + | + | 0.1~89.9 | H=Ph |
| FIRST QUADRANT | 0 | + | 90 | H=Ph |
| SECOND QUADRANT | - | + | 0.1~89.9 | H=180-Ph |
| SECOND QUADRANT | - | 0 | 0 | H=180-Ph |
| THIRD QUADRANT | - | - | 0.1~89.9 | H=180+Ph |
| THIRD QUADRANT | 0 | - | 90 | H=180+Ph |
| FOURTH QUADRANT | + | - | 0.1~89.9 | H=360-Ph |

+ : POSITIVE NUMBER

- : NEGATIVE NUMBER

FIG. 6

| SIGNAL | SIGNAL VALUE RANGE |
|---|---|
| L, Y | 0~1023 |
| S | 0~1023 |
| H | 0~1023 |
| Ph | 0~256 |
| cos(Ph) | 0~1024 |
| sin(Ph) | 0~1024 |
| DIV_H | 0~3 |
| U | -511~511 |
| V | -511~511 |

| H(DEGREE) | Ph(DEGREE) | QUADRANT | H_DIV |
|---|---|---|---|
| 0~90 | Ph=H | FIRST QUADRANT | 0 |
| 90~180 | Ph=180-H | SECOND QUADRANT | 1 |
| 180~270 | Ph=H-180 | THIRD QUADRANT | 2 |
| 270~360 | Ph=360-H | FOURTH QUADRANT | 3 |

FIG. 13

| H_DIV | U |
|---|---|
| 0 | $U= S* \cos(Ph)/\sqrt{2}$ |
| 1 | $U= -S* \cos(Ph)/\sqrt{2}$ |
| 2 | $U= -S* \cos(Ph)/\sqrt{2}$ |
| 3 | $U= S* \cos(Ph)/\sqrt{2}$ |

FIG. 14

| H_DIV | V |
|---|---|
| 0 | $U= S* \sin(Ph)/\sqrt{2}$ |
| 1 | $U= S* \sin(Ph)/\sqrt{2}$ |
| 2 | $U= -S* \sin(Ph)/\sqrt{2}$ |
| 3 | $U= -S* \sin(Ph)/\sqrt{2}$ |

FIG. 15

IMAGE DISPLAY APPARATUS

BACKGROUND

1. Technical Field

The present invention relates to a technology for adjusting an image to be displayed by an image display apparatus.

2. Related Art

In image display apparatuses for displaying various images including moving images, image signals are input, and then processed in real-time to be displayed. Therefore, in the past, in image display apparatuses such as projectors, CRTs, or LCDs, it has been general to use RGB (red, green, and blue) signals or YUV (luminance, first chrominance, and second chrominance) signals as the image signal in order to achieve easiness of display and simplification of the process.

Although the hue, brightness, chroma, and so on of the image to be displayed in such image display apparatuses can be adjusted in the sources (e.g., DVD players) of the image signals, in recent years, the image display apparatuses such as projectors are also provided with mechanisms for adjustment. When the user tries to adjust the color, brightness, sharpness, and so on of the image, the user needs to directly adjust the RGB signals, the YUV signals and so on normally processed by the image display apparatus. However, in these signals, if one of the signals is strengthened or weakened, the variation influences other colors, and therefore, it has been difficult to obtain a desired image.

Therefore, in the past, for example in color scanners, it has been performed that the RGB signals of a reference image are once converted into HLS signals to calculate differences from reference colors, and then the color adjustment of the image read therein is performed using the result of the calculation (see, e.g., JP-A-9-18724). The HLS signals are signals compliant to the Munsell color system represented by HLS (hue, lightness, and saturation) as a reference of an object color. As a technology for performing color correction using the HLS signals what is disclosed in JP-A-11-69186 is also known.

However, both of these technologies are intended to correct misalignment included in the image processing system or shift in balance, and therefore, it is not achievable to adjust the image signals processed in real-time to be a desired state and to perform display in the image display apparatus such as a projector, which may handle a moving image. The user only prefer to adjust the color, brightness, sharpness and so on of the image displayed presently according to the preference, but does not prefer to adjust the RGB signals or the YUV signals themselves. In the image display apparatus of the related art, there arises a problem that it is not achievable to meet the request of such a user.

SUMMARY

An advantage of some aspects of the invention is to solve at least a part of the problem described above, and the invention can be configured in the following embodiments and aspects.

According to an aspect of the invention, there is provided an image display apparatus adapted to display an image based on an image signal input, including a color adjustment circuit adapted to perform one of a modification process and a correction process individually on a hue signal, a lightness signal, and a saturation signal included in first HLS signals as an image signal, and output the processed signals as second HLS signals.

According to the image display apparatus of this aspect, since the modification process or the correction process is performed on the HLS signals as the image signal by the color adjustment circuit as hardware, it is possible to stably perform the process with a high processing speed compared to performing the same process by the CPU executing software.

According to the image display apparatus of this aspect, since the color adjustment instruction section is provided, it is possible to perform arbitrary modification process and correction process on the HLS signals input to the color adjustment circuit.

According to the image display apparatus of this aspect, it is possible for the user to view and understand the processing content of the modification process and the correction process performed by the image display apparatus.

According to the image display apparatus of this aspect, it is possible for the user to view and understand the hue, the lightness, and the saturation individually in the processing content of the modification process and the correction process performed by the image display apparatus.

According to the image display apparatus of this aspect, since the user can view the hue with reference to blue, magenta, red, yellow, green, and cyan in the processing content of the modification process and the correction process performed by the image display apparatus, it becomes easy to understand the content of the modification and the correction processes.

According to the image display apparatus of this aspect, it becomes possible for the user to modify the processing content of the modification and the correction process performed by the image display apparatus, in other words, the user can modify the process content of the modification process and the correction process performed by the image display apparatus regarding the hue while checking the color adjusting images expressed referring to blue, magenta, red, yellow, green, and cyan, and thus it becomes possible to perform the color adjustment of the image displayed by the image display apparatus.

According to the image display apparatus of this aspect, since the color space conversion circuit for converting the input image signal composed of the YUV signals into the HLS signals is provided, even if the image signal input thereto is the YUV signals, it is possible to perform the modification process or the correction process on the image signal by the color adjustment circuit.

According to the image display apparatus of this aspect, since the color space conversion circuit performs the conversion process of the first signals corresponding to the three elements of luminance, first chrominance, and second chrominance, so-called YUV signals into the second signals corresponding to the three elements of lightness, saturation, and hue, so-called HLS signals using an electric circuit as hardware, the process can be performed stably with a higher processing speed compared to performing the same conversion process by the CPU executing the program as software. Therefore, it is possible to stably output the HLS signals to the color adjustment circuit. As a result, it becomes possible to perform the signal conversion of the image signals input thereto at a high speed, for example, to convert the image signal of a moving picture from the YUV signals to the HLS signals in real time while displaying the moving picture in the case of, for example, performing the moving picture display or the like, and at the same time, it is possible to stably correspond at a high speed to the instruction for modifying the processing content of the modification process or the correction process of the HLS signals instructed by the user as the color adjustment using the color adjustment circuit.

According to the image display apparatus of this aspect, since there is provided the inverse conversion circuit for converting the second HLS signals modified or corrected by the color adjustment circuit and then output therefrom into the second YUV signals, the image display apparatus can display the image based on the YUV signal as the image signal suitable for displaying the image.

It should be noted that the invention can be put into practice in various forms. For example, the invention can be realized in the forms of a color adjustment method and an apparatus, a color adjustment system, an integrated circuit for realizing the function of the method or the apparatus, a computer program, a recording medium storing the computer program, and so on.

BRIEF DESCRIPTION OF THE DRAWINGS

The invention will be described with reference to the accompanying drawings, wherein like numbers reference like elements.

FIG. 5 is an explanatory diagram showing an example of floating-point calculation in a floating-point converter 24.

FIG. 6 is an explanatory diagram for explaining a calculation method of a selector adder 38 outputting a hue value H.

FIG. 13 is an explanatory diagram showing a calculation method of a Ph outputter 71 calculating a hue angle Ph and a quadrant number DIV_H.

FIG. 14 is an explanatory diagram showing arithmetic expressions of calculation executed by a first chrominance outputter 75.

FIG. 15 is an explanatory diagram showing arithmetic expressions of calculation executed by a second chrominance outputter 76.

DESCRIPTION OF AN EXEMPLARY EMBODIMENT

One embodiment of the invention will hereinafter be explained based on a specific example in the following order.

A. Embodiment

A1. Schematic Configuration of Liquid Crystal Projector

A2. Color Space Conversion Circuit

A3. Color Adjustment

A4. Inverse Conversion Circuit

B. Modified Examples

A. Embodiment

A1. Schematic Configuration of Liquid Crystal Projector

Figure 1:
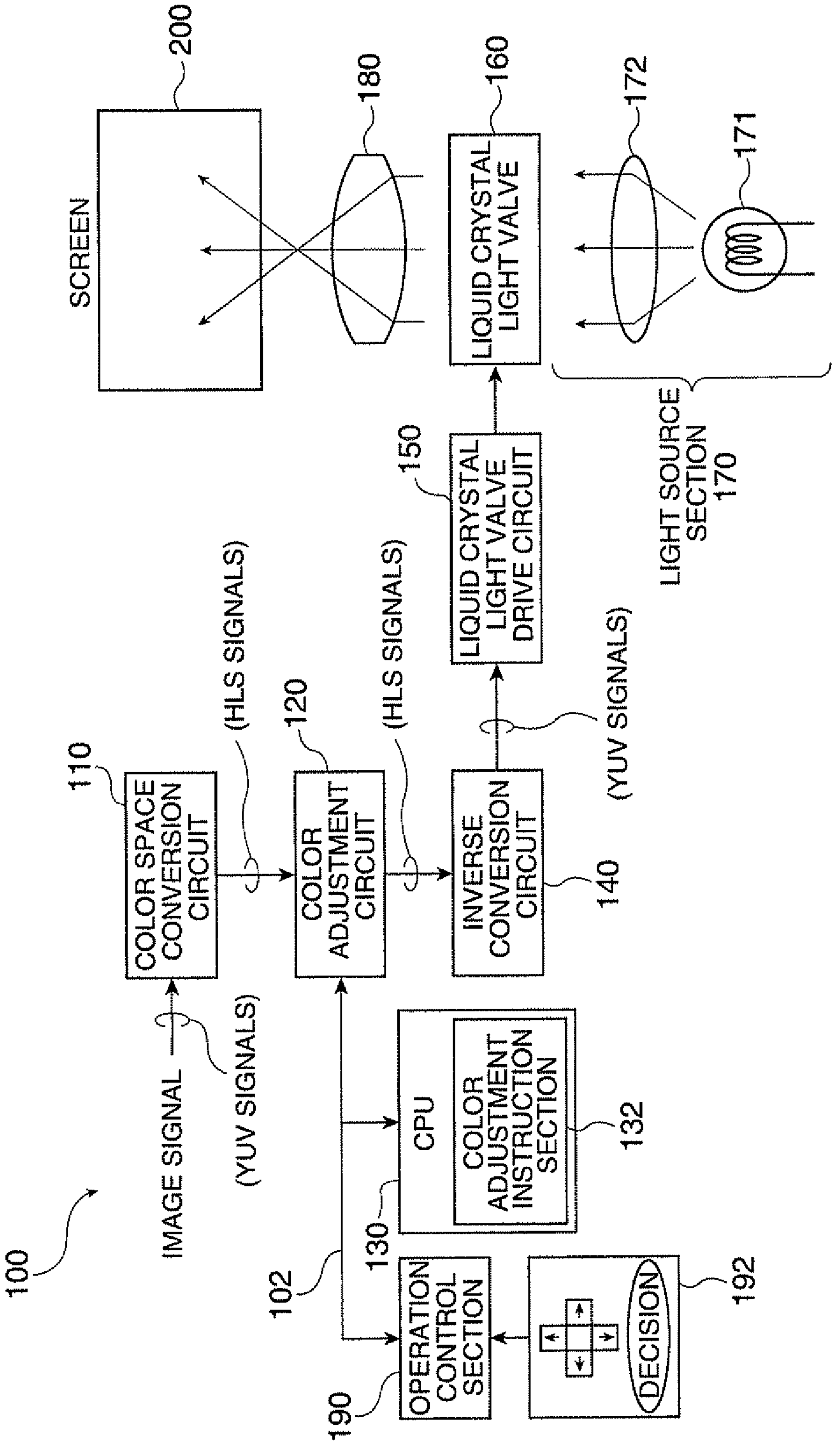
FIG. 1 is a block diagram showing an overall configuration of a liquid crystal projector 100 according to an embodiment.

FIG. 1 is a block diagram showing an overall configuration of a liquid crystal projector 100 to which a color space conversion circuit as an embodiment of the invention is applied. The liquid crystal projector 100 is provided with a color space conversion circuit 110, a color adjustment circuit 120, a CPU 130, an inverse conversion circuit 140, a liquid crystal light valve drive circuit 150, a liquid crystal light valve 160, a light source section 170, a projection lens 180, an operation control section 190, operation buttons 192, and displays moving images on a screen 200 based on image signals input to the color space conversion circuit 110. Further, the color adjustment circuit 120, the CPU 130, and the operation control section 190 are connected to each other via an internal bus 102. It should be noted that both of the cases are possible, in which the image signals are input in real-time to the color space conversion circuit 110 by an input device such as a video camera, a scanner, and a personal computer not shown, and the image signals are retrieved into the color space conversion circuit 110 from a computer readable storage medium not shown. Here, as the computer readable storage medium, any one of ROM, RAM, CO-ROM, DVD, FD, MD, a memory card, and so on can be adopted.

The color space conversion circuit 110 is an electric circuit for performing YUV-HLS conversion on the digital image signal input as YUV signal to thereby output the image signal as HLS signals. The color space conversion circuit 110 will be explained later in detail.

The color adjustment circuit 120 is a circuit for changing signals of hue, lightness, and saturation (hereinafter also referred to as a hue signal, a lightness signal, and a saturation signal, respectively) corresponding to the HLS signals thus input thereto, and performing correction (hereinafter also referred to as a gain correction) of the output gain value of each of the lightness and saturation signals in accordance with a command from the CPU 130. It should be noted that hereinafter the process for changing or correcting each of the signals is also referred to as a modification/correction process. The color adjustment circuit 120 will be explained later in detail.

The CPU 130 is provided with a color adjustment instruction section 132, which is realized by the CPU 130 executing a specific program previously stored in the ROM not shown. The color adjustment instruction section 132 controls the content of the modification/correction process executed by the color adjustment circuit 120 described above. The color adjustment instruction section 132 will be explained later in detail.

The inverse conversion circuit 140 is a circuit for performing conversion (hereinafter also referred to as HLS-YUV conversion) on the HLS signals input thereto into the YUV signals, and then outputting the YUV signals. The HLS signals input to the inverse conversion circuit 140 are signals, which have been changed and on which the gain correction has been executed due to the color adjustment by the user described above. The inverse conversion circuit 140 will be explained later in detail.

The liquid crystal light valve drive circuit 150 is a circuit for driving the liquid crystal light valve 160. The liquid crystal light valve 160 is a panel for forming an image based on the signals generated by the liquid crystal light valve drive circuit

150, and modulates the light emitted from the light source section 170, and then emits the light necessary for projection toward the screen 200.

The light source section 170 is a light source for projecting an image, and is mainly provided with a lamp 171 for emitting the light, and a lens 172 for converting the light emitted from the lamp 171 into collimated light. The collimated light is modulated by the liquid crystal light valve 160, and then input to the projection lens 180. The projection lens 180 enlargedly displays the light projected from the light source section 170 on a screen. Further, the screen 200 has a projection surface on which a projection image projected from the liquid crystal projector 100 is displayed.

The operation control section 190 receives an instruction for color adjustment on the image, which is projected by the liquid crystal projector 100, from the user via the operation buttons 192, and then transmits it to the CPU 130 via the internal bus 102. The operation buttons 192 include arrow key buttons and a decision button, and when performing the color adjustment described later, the user performs the color adjustment of an image using these buttons. It should be noted that although the liquid crystal projector 100 receives the instruction from the user via the operation control section 190 and the operation buttons 192 in the present embodiment, it is also possible to arrange that the instruction from the user is received via an external operation device such as an operation panel provided to the liquid crystal projector 100, or a mouse or a keyboard provided to a computer connected to the liquid crystal projector 100.

A2. Color Space Conversion Circuit

Figure 2:
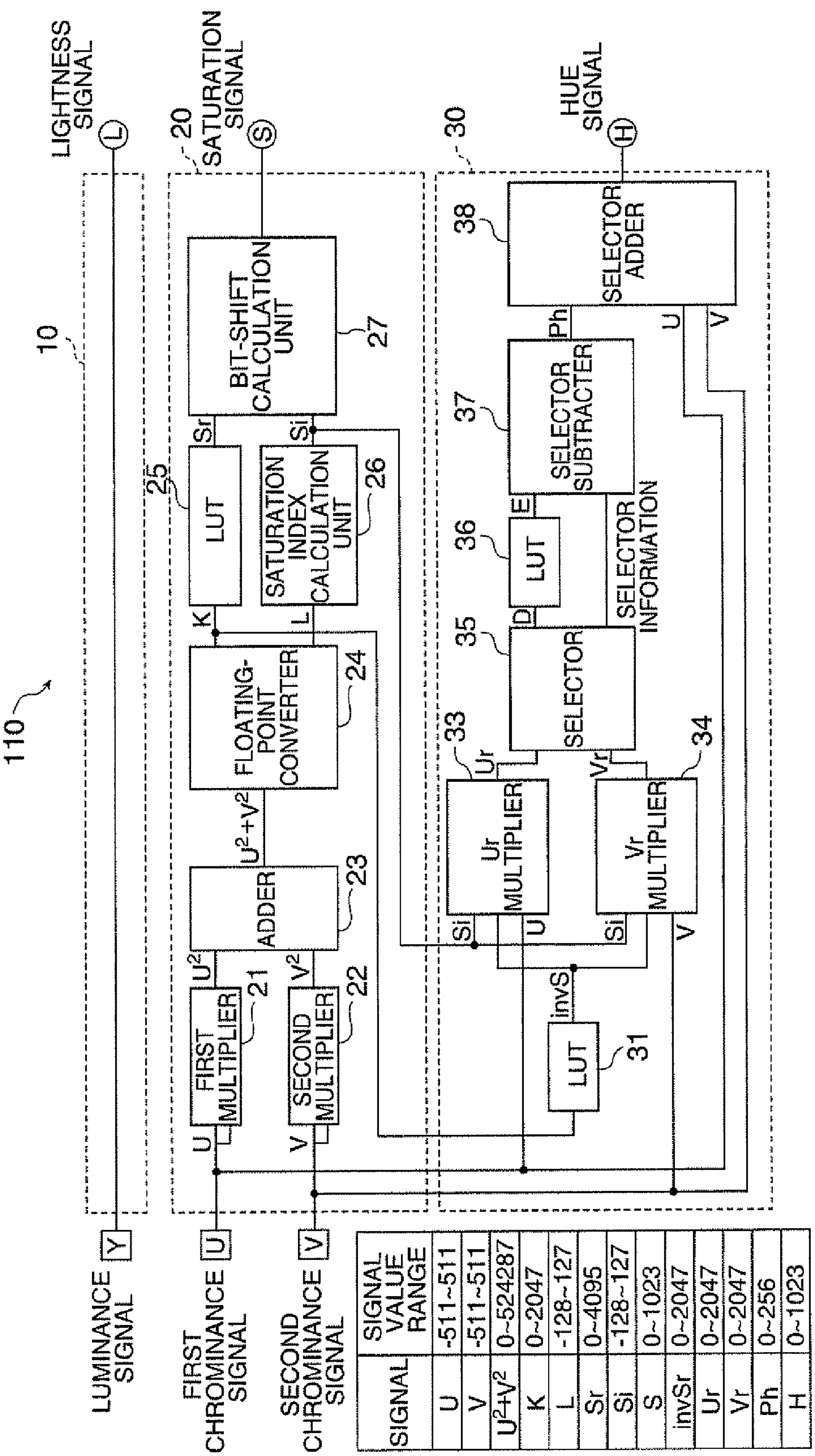
FIG. 2 is a block diagram showing a configuration of a color space conversion circuit in the embodiment.

Specific configuration and operation of the color space conversion circuit 110 will hereinafter be explained. FIG. 2 is a block diagram showing a configuration of the color space conversion circuit 110. The color space conversion circuit 110 is provided with a lightness calculation section 10, a saturation calculation section 20, and a hue calculation section 30, as shown in the drawings. The color space conversion circuit 110 converts the luminance signal (Y), the first chrominance signal (U), and the second chrominance signal (V) included in the image signal input therein into the lightness signal (L), the saturation signal (S), and the hue signal (H), and then outputs these signals. It should be noted that synchronous clock not shown is input to each of the calculation units to synchronize the operations between the circuits, wherein the synchronous clock signal is omitted from illustrations. Therefore, the YUV signals input to the color space conversion circuit 110 are converted into the HLS signals corresponding to the group of signals using the synchronous clock, and are output in a synchronized manner.

Figure 3:
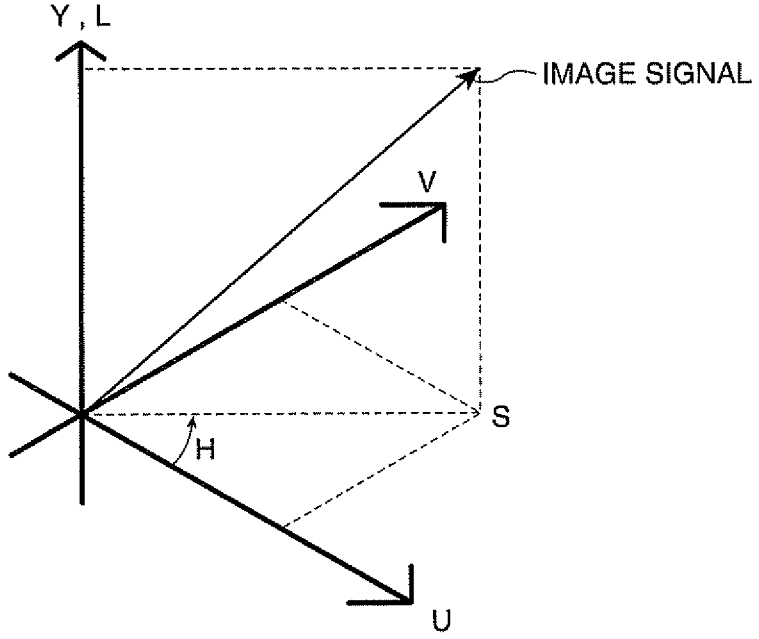
FIG. 3 is an explanatory diagram showing relationships between YUV signals and HLS signals.
Figure 4:
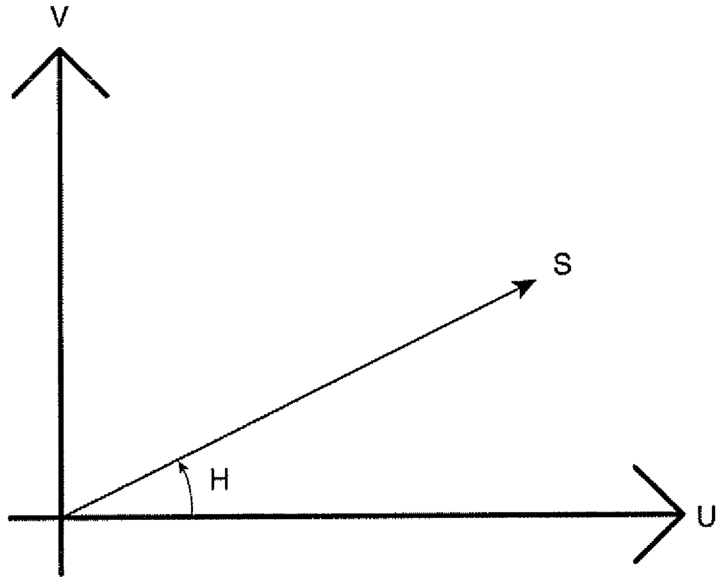
FIG. 4 is an explanatory diagram of the YUV space and the HLS space viewed from the Y axis and the L axis corresponding respectively to luminance and lightness elements.

Here, the relationships between YUV signals and HLS signals will be explained. FIG. 3 is an explanatory diagram showing relationships between YUV signals and HLS signals. The YUV signals are the signals obtained by expressing the image signal with three-dimensional Cartesian space (hereinafter also referred to as YUV color space) composed of three elements of luminance, first chrominance, and second chrominance. The HLS signals are the signals obtained by expressing the image signal with three-dimensional Cartesian space (hereinafter also referred to as HLS color space) composed of three elements of hue, lightness, and saturation. As shown in FIG. 3, the luminance on the YUV color space and the lightness on the HLS color space have the same axis direction in both of the Cartesian spaces and correspond one-to-one to each other. Therefore, it is possible to treat the luminance signal and the lightness signal as the same signal. As a result, converting the image signal input as the YUV signals into the HLS signals substantially corresponds to converting the first chrominance signal and the second chrominance signal included in the image signal into the hue signal and the saturation signal. FIG. 4 is a diagram of the both Cartesian spaces shown in FIG. 3 viewed from a point located on the Y and L axis corresponding respectively to the luminance and lightness elements. The color space conversion circuit 110 shown in FIG. 2 performs the YUV-HLS conversion based on the relationship between the YUV space and the HLS space shown in FIGS. 3 and 4.

In FIG. 2, the lightness calculation section 10 applies the value (hereinafter also referred to as a luminance value) corresponding to the luminance signal (Y), which is input to the color space conversion circuit 110, directly to the value (hereinafter also referred to as a lightness value) corresponding to the lightness signal (L), and then output it as the lightness signal (Y). This derives from the fact that the luminance on the YUV color space and the lightness on the HLS color space correspond one-to-one to each other in the both Cartesian spaces as shown in FIG. 3. In other words, the lightness calculation section 10 directly outputs the luminance signal (Y) input thereto as the lightness signal (L). It should be noted that in the present embodiment, the luminance signal (Y) and the lightness signal (L) are both 10 bit gray-scale data.

The saturation calculation section 20 outputs the saturation signal (Y) based on the first chrominance signal (U) and the second chrominance signal (V) input to the color space conversion circuit 110. The saturation calculation section 20 is provided with a first multiplier 21, a second multiplier 22, an adder 23, a floating-point converter 24, a look-up table 25, a saturation index calculation unit 26, and a bit-shift calculation unit 27. It should be noted that hereinafter the look-up table is also referred to as LUT, and a look-up table 25 is also described as an LUT 25, for example.

Hereinafter, the process performed until the saturation calculation section 20 converts the first chrominance signal (U) and the second chrominance signal (V) into the saturation signal (S) will be explained along the order in which the signal flows. The first chrominance signal (U) and the second chrominance signal (V) are each 10 bit gray-scale data. Therefore, each of the signals takes a signal value in a range of 0 through 1023. However, since the signals are treated as representing a colorless state when the signal value is 512, in such a case, the signal value is hereinafter expressed as −512 through 511.

The first multiplier 21 converts the first chrominance signal input thereto into the gray-scale data in the range of −512 through 511, and then performs a rounding-off process for rounding off the gray-scale data in the range of −512 through 511 into the gray-scale data in the range of −511 through 511 in order to express the signal value using the gray-scale value having a symmetrical property around 0 (zero). After performing the rounding-off process, the first multiplier 21 calculates a first multiplication value $U^2$ obtained by raising the value (hereinafter also referred to as a first chrominance value U) of the first chrominance signal. The second multiplier 22 performs substantially the same process as that of the first multiplier 21 on the second chrominance signal input thereto to thereby calculate a second multiplication value $V^2$ obtained by raising the value (V) of the second chrominance signal. The adder 23 calculates an addition value obtained by adding the first and second multiplication values $U^2$, $V^2$ respectively output from the first and second multipliers 21, 22 to each other, namely the value corresponding to $U^2+V^2$.

The value obtained by calculating the square root of the addition value output by the adder 23, and then normalizing it into the scale of the HLS signals corresponds to the saturation value S. Denoting the square root of the addition value as a square root extraction result value R, the normalization is performed by multiplying the square root extraction result value R by √2. In this case, the saturation value S and the square root extraction result value R are expressed by Formula 1 below.

When the signal corresponding to the addition value $U^2+V^2$, namely the value of $R^2$ is input, the floating-point converter 24 performs floating-point calculation on the value of $R^2$ to thereby obtain a first real value K and a first index value L satisfying Formula 2. Further, in this case, the value of the first index value L is obtained as an even number. FIG. 5 shows an example of the floating-point calculation in the floating-point converter 24.

$$S=\sqrt{2}*R \tag{1}$$

$$R^2=K/2^L \tag{2}$$

Then, when expressing the saturation value S with a second real value Sr and a second index value Si, according to the Formulas 1 through 3, the second real value Sr and the second index value Si can be expressed as Formulas 4 and 5. It should be noted that "n" in the Formulas 4 and 5 represents a positive integer. The "n" avoids deterioration of the accuracy of the calculation performed thereafter caused by reduction of the value of the signal output therefrom due to the characteristic of the calculation performed by each calculation unit described later. In order to assure the accuracy of the calculation, a positive integer is substituted for "n" to thereby perform bit-shift operation on the value of the signal output by the calculation.

$$S=Sr/2^{Si} \tag{3}$$

$$Sr=2^n*\sqrt{2}*\sqrt{K} \tag{4}$$

$$Si=L/2+n \tag{5}$$

The LUT 25 shown in FIG. 2 is an LUT from which the second real value Sr satisfying the Formula 4 is read out with respect to the value of the first real value K output from the floating-point converter 24. In the present embodiment, the LUT 25 stores the value of the second real value Sr corresponding to the first real value K taking a value in a range of 0 through 2047.

The saturation index calculation unit 26 is a calculation unit for performing the calculation process expressed by the Formula 5 on the value of the first index value L output from the floating-point converter 24 to thereby obtain the second index value Si. As described above, the floating-point converter 24 outputs the first index value L as an even value. Therefore, it is not required to perform calculation including a concept of a decimal fraction when the saturation index calculation unit 26 performs the calculation process expressed by the Formula 5. Further, the saturation index calculation unit 26 outputs the second index value Si as an integer value.

The bit-shift calculation unit 27 is a calculation unit for obtaining the saturation value S satisfying the Formula 3 from the second real value Sr and the second index value Si respectively output from the LUT 25 and the saturation index calculation unit 26. The second index value Si is output as an integer value from the saturation index calculation unit 26. Therefore, when performing the calculation process of the Formula 3, the bit-shift calculation unit 27 performs the bit-shift operation corresponding to Si digits on the value of the second real value Sr to thereby output the saturation value S. It should be noted that the floating-point converter 24, the LUT 25, the saturation index calculation unit 26, and the bit-shift calculation unit 27 correspond to a square root extractor described in the appended claims. The calculation process performed by the saturation calculation section 20 is as described above.

Then, the hue calculation section 30 will be explained. As shown in FIG. 2, the hue calculation section 30 outputs the hue signal (H) based on the first chrominance signal (U), the second chrominance signal (v), and the first real value K and the second index value Si obtained by the saturation calculation section 20. The hue calculation section 30 is provided with an LUT 31, a Ur multiplier 33, a Vr multiplier 34, a selector 35, an LUT 36, a selector subtracter 37, and a selector adder 38.

Here, a cosine value Ur and a sine value Vr expressed by Formulas 6 and 7 using the first chrominance value U, the second chrominance value V, and the square root extraction result value R. Further, the reciprocal of the second real value Sr is defined by "invSr" expressed by Formula 8 using the second real value Sr obtained by the saturation calculation section 20. Further, according to Formulas 4 and 8, invSr can be expressed by Formula 8a. As a result, according to the Formulas 1 through 8 and 8a, the cosine value Ur and the sine value Vr can be expressed by Formulas 9 and 10. It should be noted that "w" and "m" in the Formulas 8, 8a, 9, and 10 each represent a positive integer. Similarly to "n" described above, due to the characteristic of the calculation by each calculation unit described later, a positive integer is appropriately substituted for each of "w" and "m" in order to assure accuracy of the calculation to thereby perform bit-shift operation on the value of the signal output by the calculation.

$$Ur=U/R \tag{6}$$

$$Vr=V/R \tag{7}$$

$$invSr=w/Sr \tag{8}$$

$$invSr=w/(2n*\sqrt{2}*\sqrt{K}) \tag{8a}$$

$$Ur=|U|*\sqrt{2}*invSr*2^{(Si-m)} \tag{9}$$

$$Vr=|V|*\sqrt{2}*invSr*2^{(Si-m)} \tag{10}$$

The LUT 31 shown in FIG. 2 is an LUT from which invSr satisfying the formula 8a is read out with respect to the first real value K output from the floating-point converter 24. Further, similarly to the LUT 25 described above, in the present embodiment, the LUT 31 stores the value of invSr corresponding to the first real value K taking a value in a range of 0 through 2047.

The Ur multiplier 33 performs the calculation process expressed by the Formula 9 on the first chrominance value U, the second index value Si output from the saturation index calculation unit 26, and invSr output from the LUT 31 to thereby obtain the cosine value Ur. Further, the Vr multiplier 34 performs the calculation process expressed by the Formula 10 on the second chrominance value V, the second index value Si output from the saturation index calculation unit 26, and invSr output from the LUT 31 to thereby obtain the sine value Vr.

The selector 35 compares the values of the cosine value Ur and the sine value Vr respectively output from the Ur multiplier and the Vr multiplier, and selects and then output the smaller value (hereinafter also described as a selector output value D). Further, in addition to the selector output value D, the selector 35 outputs selector information representing which is smaller as a result of the comparison between the cosine value Ur and the sine value Vr.

The LUT 36 is an LUT from which an LUT output value E satisfying Formula 11 in accordance with the selector output value D output by the selector 35. In the Formula 11, "w" represents a positive integer as described above.

$$E=\arcsin(D/w) \quad (11)$$

It should be noted that the unit of the value E is "degree."

The selector subtracter 37 selects one of two subtraction processes expressed by Formulas 12 and 13 based on the selector information output from the selector 35, and then calculates a hue angle Ph with respect to the LUT output value E.

$$Ph=E(Ur\geq Vr) \quad (12)$$

$$Ph=90-E(Ur<Vr) \quad (13)$$

Figure 7:
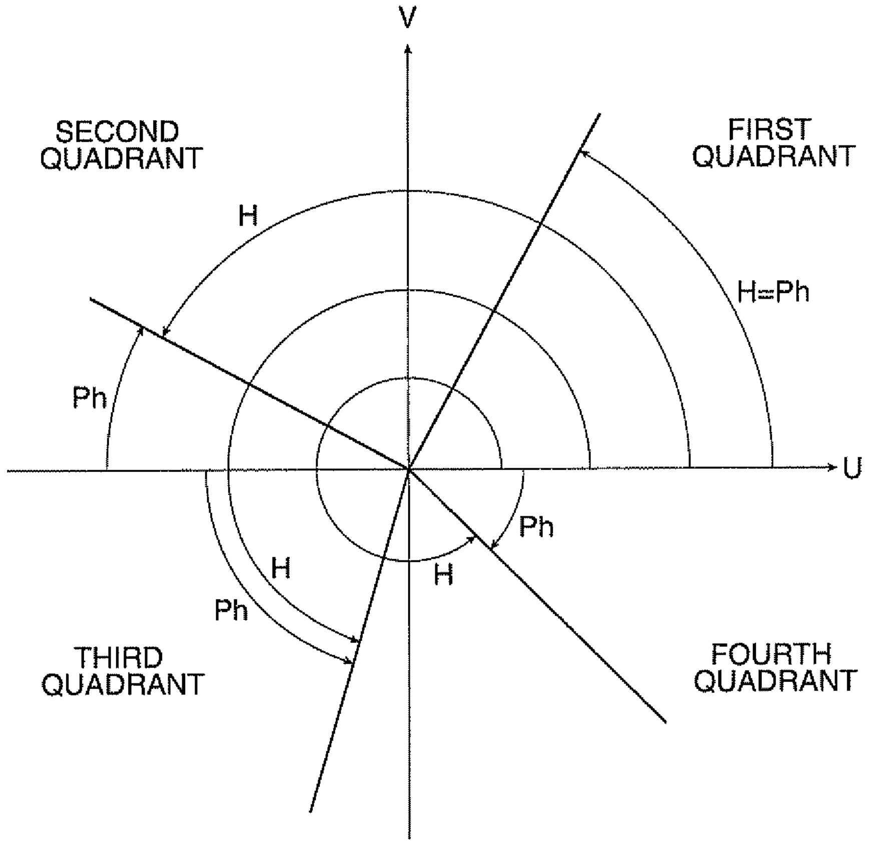
FIG. 7 is an explanatory diagram for conceptually explaining the method of calculating the hue value H performed by the selector adder 38.

FIG. 6 is an explanatory diagram for explaining a calculation method of the selector adder 38 outputting the hue value H based on the first chrominance value U, the second chrominance value V, and the hue angle Ph. The selector adder 38 selects an outputting method of the hue value H in accordance with a combination of the values of the first chrominance value U and the second chrominance value V input therein. FIG. 7 shows an explanatory diagram for conceptually explaining the calculation method of the hue value H performed by the selector adder 38 as shown in FIG. 6. FIG. 7 is a U-V graph having a lateral axis representing the first chrominance value U and a vertical axis representing the second chrominance value V. The calculation method of H performed by the selector adder 38 will be explained showing a specific example with reference to FIGS. 6 and 7.

For example, in the case in which the first chrominance value U input to the selector adder 38 is a positive value and the second chrominance value V input thereto is a positive value, the hue angle Ph corresponds to an angle in the first quadrant on the U-V graph as shown in FIG. 7. In this case, it is understood from FIG. 7 that the hue value H and the hue angle Ph are equal to each other. In FIG. 6, the calculation method of H corresponding to the case in which the first chrominance value U is a positive value and the second chrominance value is a positive value is set to be H=Ph, and it is understood that this corresponds to the calculation method of the hue value H explained with reference to FIG. 7.

Then, as a second example, in the case in which the first chrominance value U input to the selector adder 38 is a negative value and the second chrominance value V input thereto is a negative value, the hue angle Ph corresponds to an angle in the third quadrant on the U-V graph as shown in FIG. 7. In this case, as shown in FIG. 7, it is understood that the hue value H can be obtained by adding 180 degrees to the hue angle Ph. In FIG. 6, the calculation method of H corresponding to the case in which the first chrominance value U is a negative value and the second chrominance value is a negative value is set to be H=Ph+180, and it is understood that this corresponds to the calculation method of the hue value H explained with reference to FIG. 7. As shown in the two specific examples described above, the selector adder 38 outputs the hue value H based on the first chrominance value U, the second chrominance value V, and the hue angle Ph using the calculation method corresponding to FIG. 6. It should be noted that the selector 35, the LUT 36, the selector subtracter 37, and the selector adder 38 correspond to a hue angle calculation section described in the appended claims. Further, the selector 35 corresponds to a first determination section described in the appended claims, and the selector adder 38 corresponds to a second determination section and a hue value output section described in the appended claims. As described hereinabove, according to the method described above, the color space conversion circuit 110 performs the YUV-HLS conversion on the YUV signals input thereto as the image signal to thereby output the HLS signals.

A3. Color Adjustment

Figure 8:
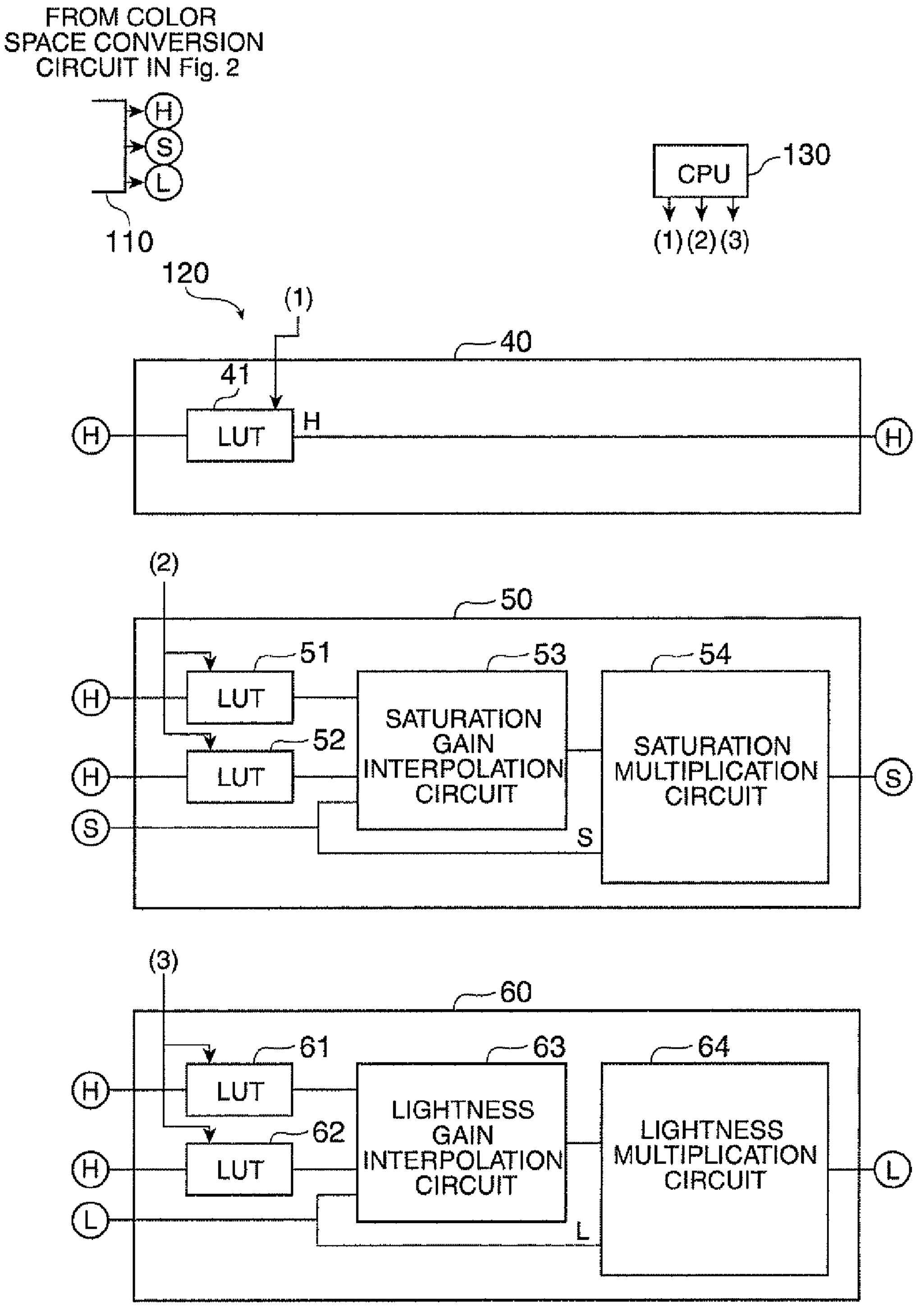
FIG. 8 is a block diagram showing a configuration of a color adjustment circuit 120.

Then, the color adjustment performed by the user and the process performed by the liquid crystal projector 100 on that occasion will be explained in detail. The HLS signals output by the YUV-HLS conversion performed by the color space conversion circuit 110 are input to the color adjustment circuit 120. FIG. 8 is a block diagram showing a configuration of the color adjustment circuit 120. The color space conversion circuit 120 is provided with a hue adjustment circuit 40, a saturation adjustment circuit 50, and a lightness adjustment circuit 60, as shown in the drawings.

The hue adjustment circuit 40 is provided with an LUT 41. The LUT 41 is an LUT storing a value of the hue signal (H) to be output corresponding to a value of the hue signal (H) input thereto, and is formed of a RAM. It should be noted that hereinafter the value to be input to the LUT is also referred to as an input signal value, and the value to be output from the LUT is also referred to as an output signal value.

Then, the configuration of the saturation adjustment circuit 50 will be explained. The saturation adjustment circuit 50 is provided with an LUT 51, an LUT 52, a saturation gain interpolation circuit 53, and a saturation multiplication circuit 54. The saturation adjustment circuit 50 is provided with the hue signal (H) and the saturation signal (S) input thereto. The LUT 51 is an LUT storing, by each of the hue values, an output gain value corresponding to the saturation signal value to be output when the signal value of the saturation signal S out of the hue signal and the saturation signal input to the saturation adjustment circuit 50 is zero (the smallest value of the saturation signal). The LUT is an LUT storing, by each of the hue values, an output gain value corresponding to the saturation signal value to be output when the saturation signal value S input to the saturation adjustment circuit 50 is 1023 (the largest value of the saturation signal). The saturation gain interpolation circuit 53 calculates and then outputs the saturation gain value as the output gain value of the saturation signal in each of the hue values when the input signal value of the saturation signal is in between 0 and 1023. The saturation multiplication circuit 54 multiplies the saturation signal (S) and the saturation gain value by each other, and then outputs the result as a color-adjusted saturation signal (S). These processes will be explained later in detail showing a specific example.

Then, the lightness adjustment circuit 60 will be explained. The lightness adjustment circuit 60 has substantially the same configuration as that of the saturation adjustment circuit 50 described above. A difference therebetween in the configuration and the process in comparison with the saturation adjustment circuit 50 is that the signal to be the processing object is changed to the lightness signal (L). The lightness adjustment circuit 60 is provided with an LUT 61, an LUT 62, a lightness gain interpolation circuit 63, and a lightness multiplication circuit 64. The lightness adjustment circuit 60 is provided with the hue signal (H) and the lightness signal (L) input thereto. The LUT 61 is an LUT storing, by each of the hue values, an output gain value corresponding to the lightness signal value to be output when the signal value of the lightness signal L out of the hue signal and the lightness signal input to the lightness adjustment circuit 60 is zero (the smallest value of the lightness signal). The LUT 62 is an LUT storing, by each of the hue values, an output gain value corresponding to the lightness signal value to be output when the lightness signal value L input to the lightness adjustment circuit 60 is 1023 (the largest value of the lightness signal). The lightness gain interpolation circuit 63 calculates and then outputs the lightness gain value as the output gain value of the lightness signal in each of the hue values when the input signal value of the lightness signal is in between 0 and 1023. The lightness multiplication circuit 64 multiplies the lightness signal (L) and the lightness gain value by each other, and then outputs the result as a color-adjusted lightness signal (L). It should be noted that each of the LUTs in the color adjustment circuit 120 is provided with an initial value written therein when powering on the liquid crystal projector 100. The value of the LUT is rewritten in accordance with an instruction of the color adjustment by the user operation explained below.

Figure 9:
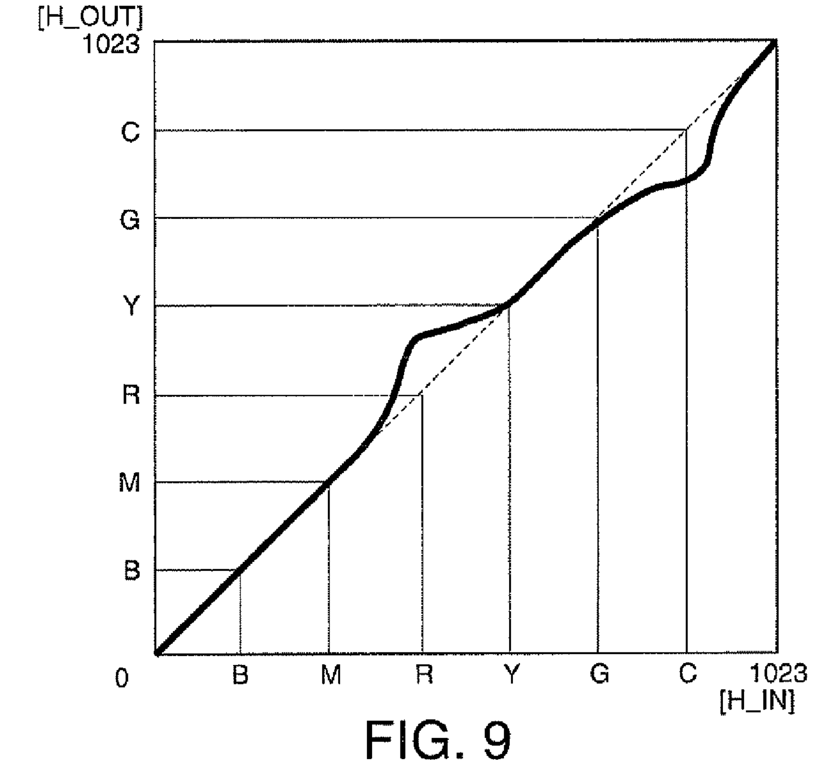
FIG. 9 is an explanatory diagram showing a hue adjusting image.

Then, the process of the color adjustment performed by the liquid crystal projector 100 in accordance with the instruction of the user will be explained. The user performing the color adjustment performs the color adjustment while checking color adjusting images projected on the screen 200 by the liquid crystal projector 100. FIG. 9 is an explanatory diagram showing a hue adjusting image out of the color adjusting images. The hue adjusting image is created by the CPU 130 based on the correspondence relationship between the input signal value and the output signal value stored in the LUT 41. Specifically, the lateral axis of the hue adjusting image shown in FIG. 9 corresponds to the input signal value, and the vertical axis thereof corresponds to the output signal value. The CPU 130 projects the hue adjusting image thus created on the screen 200. These functions are performed by the CPU 130 as the functions of the color adjustment instruction section 132. Then, the user looking at the hue adjusting image projected on the screen 200 performs the color adjustment related to hue using the operation buttons 192.

Along the instruction of the color adjustment performed by the user via the operation button 192, the CPU 130 performs rewriting of the output signal value of the hue signal (H) stored in the LUT 41. The LUT 41 having the output signal value thus rewritten changes the value of the hue signal (H) input to the hue adjustment circuit 40 in accordance with the output signal value thus rewritten, and then outputs the result.

The hue adjusting image shown in FIG. 9 will be explained in detail. As described above, the hue adjusting image has the lateral axis corresponding to the input signal value and the vertical axis corresponding to the output signal value. In each of the vertical axis and the lateral axis, there are disposed reference axes at positions of the hue values corresponding respectively to blue (B), magenta (M), red (R), yellow (Y), green (G), and cyan (C). Further, the heavy line in the hue adjusting image represents the content of the process of changing the hue signal performed by the hue adjustment circuit 40. The user selects and determines either one of the hue axes of blue (B), magenta (M), red (R), yellow (Y), green (G), and cyan (C) using the arrow key buttons and the decision button provided to the operation buttons 192, and then moves up and down a part of the heavy line corresponding to the selected hue axis to thereby deform the shape of the heavy line, thus the color adjustment of the image to be projected by the liquid crystal projector 100 regarding hue is performed. As an example, according to the heavy line shown in the hue adjusting image of FIG. 9, the hue adjustment circuit 40 performs the process of "shifting red (R) toward yellow (Y) and shifting cyan (C) to green (G)" in the image to be projected on the hue signal (H).

Figure 10:
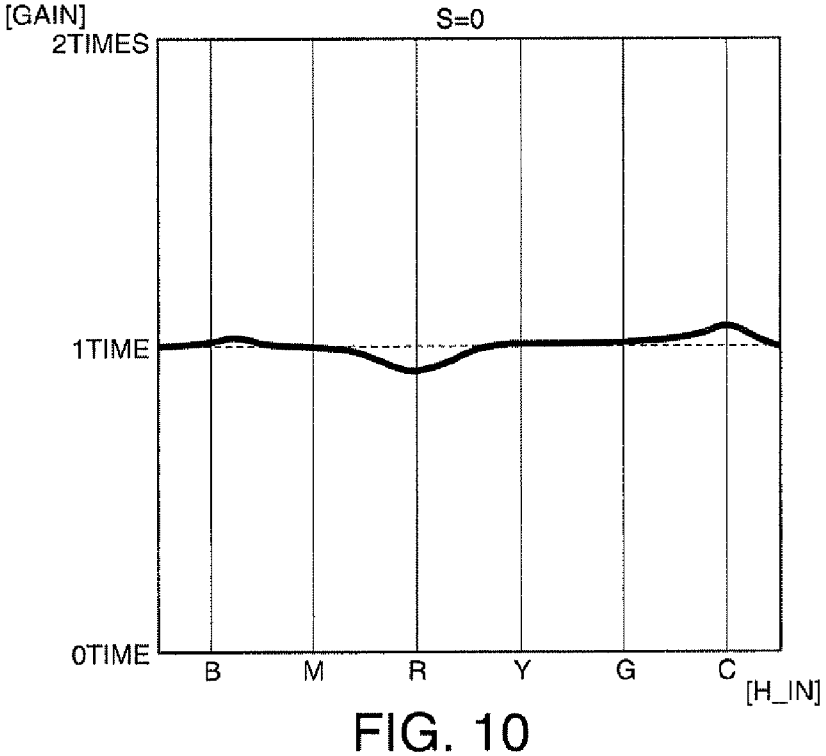
FIG. 10 is an explanatory diagram showing a saturation adjusting image.

Then, a saturation correction process performed by the liquid crystal projector 100 in accordance with the instruction of the user will be explained. FIG. 10 is an explanatory diagram showing a saturation adjusting image out of the color adjusting images. In reality, the saturation adjusting image includes two images, namely an image (hereinafter also referred to as a minimum saturation image) corresponding to the saturation signal value S of zero and an image (hereinafter also referred to as a maximum saturation image) corresponding to the saturation signal value S of 1023. The minimum saturation image and the maximum saturation image are different in the shape of the heavy line representing the content of the process, but the same in the other part, and therefore FIG. 10 shows the saturation adjusting image corresponding to S=0, namely the minimum saturation image.

The lateral axis of the minimum saturation image shown in FIG. 10 represents the value of the hue signal input to the color adjustment circuit 120. The vertical axis represents the value of the output gain of the saturation signal output in accordance with the input signal value of the saturation signal input thereto. In the lateral axis, there are disposed reference axes at positions of the hue values corresponding respectively to blue (B), magenta (M), red (R), yellow (Y), green (G), and cyan (C). Further, the heavy line in the minimum saturation image expresses the output gain value corresponding to the value of the saturation signal to be output in accordance with the input saturation signal with S=0 for each value of the input hue signal. It should be noted that as described above, the maximum saturation image is substantially the same image except the shape of the heavy line of the minimum saturation image shown in FIG. 10, and therefore, explanation therefor will be omitted.

Similarly to the operation of the hue adjustment described above, the user selects and determines either one of the hue axes of blue (s), magenta (M), red (R), yellow (Y), green (G), and cyan (C) using the arrow key buttons and the decision button provided to the operation buttons 192, and then deforms the shape of the heavy line in the minimum saturation image and the maximum saturation image, thus adjusting the output gain of the saturation signal of the image to be projected by the liquid crystal projector 100, thereby performing the color adjustment regarding color saturation.

Figure 11:
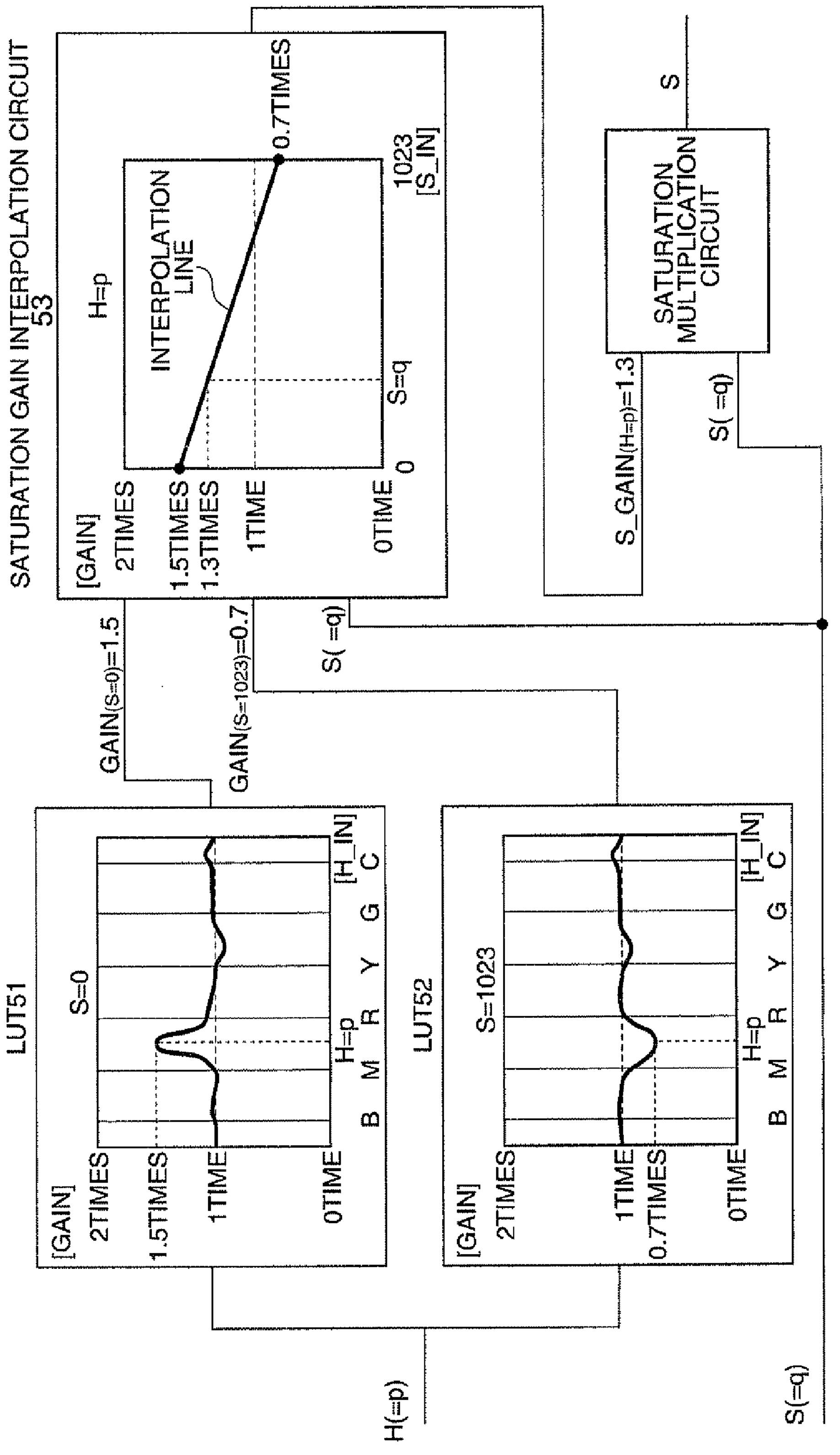
FIG. 11 is an explanatory diagram showing a concept of a process executed by a saturation adjustment circuit 50.

The process content performed by the saturation adjustment circuit 50 described above will be explained showing a specific example with reference to FIG. 11. FIG. 11 is an explanatory diagram showing a concept of the process performed by the saturation adjustment circuit 50 along the content of the present specific example. As shown in the LUT 51 and the LUT 52 in FIG. 11, it is assumed that the user has previously deformed the shapes of the heavy lines of the minimum saturation image and the maximum saturation image to thereby set the output gain values of the saturation signal corresponding respectively to S=0 and S=1023. Now, the case in which the image signal is input to the color adjustment circuit 120, and the hue signal (H) and the saturation signal (S) included in the image signal are input to the saturation adjustment circuit 50 is considered. It is assumed that the hue signal value H and the saturation signal value S at this moment are, for example, H=p, S=q, respectively. When the hue signal with H=p is input to each of the LUT 51 and the LUT 52, the LUT 51 outputs the output gain value corresponding to S=0, and the LUT 52 outputs the output gain value corresponding to S=1023. In the present specific example, the output gain value in the LUT 51 corresponding to S=0 is 1.5 as shown in FIG. 11. Further, the output gain value in the LUT 52 corresponding to S=1023 is 0.7. These two output gain values are input to the saturation gain interpolation circuit 53.

The saturation gain interpolation circuit 53 generates an interpolation line corresponding to H=p as shown in FIG. 11.

The interpolation line is a line connecting the point corresponding to the output gain of 1.5 corresponding to S=0 and the point corresponding to the output gain of 0.7 corresponding to S=1023 with a straight line. After generating the interpolation line corresponding to H=p, the saturation gain interpolation circuit 53 obtains the saturation gain value, which corresponds to the input signal value S=q of the saturation signal input thereto, from the interpolation line, and then outputs it toward the saturation multiplication circuit 54. In the present specific example, the saturation gain value corresponding to the input signal value S=q becomes 1.3 as shown in FIG. 11. The saturation multiplication circuit 54 outputs a saturation signal corresponding to the value obtained by multiplying the input signal value of the saturation signal (S) input to the saturation adjustment circuit 50 by the saturation gain value 1.3 as a color-adjusted saturation signal.

Then, a lightness correction process performed by the liquid crystal projector 100 in accordance with the instruction of the user will be explained. The user performing the color adjustment performs the color adjustment regarding lightness while checking a lightness adjusting image out of the color adjusting images projected on the screen 200 by the liquid crystal projector 100. The lightness adjusting image used by the user for performing the lightness adjustment of the image is substantially the same as the saturation adjusting image described above, but is different from the lightness adjusting image described above in that the element to be the adjustment object is changed to lightness. Therefore, the explanation and the illustration of the lightness adjusting image will be omitted.

As explained hereinabove, the liquid crystal projector 100 performs the color adjustment of the image to be projected using the CPU 130 performing the rewriting of each of the LUTs provided to the color adjustment circuit 120 as the process of the color adjustment instruction section 132 along the instruction of the color adjustment performed by the user via the operation control section 190 and the operation buttons 192. It should be noted that the liquid crystal projector 100 is provided with an on-screen display (OSD) processing section not shown, and the CPU 130 projects the hue adjusting image, the saturation adjusting image, and the lightness adjusting image on the screen 200 so as to overlap with the projection image as a function of the OSD processing section. Further, the color adjustment instruction section 132 performs a curve interpolation process on the heavy line representing the content of the modification/correction process expressed on the color adjusting images so that the heavy line has a smooth curve profile when the user moves up and down the heavy line by the operation for the color adjustment.

A4. Inverse Conversion Circuit

Figure 12:
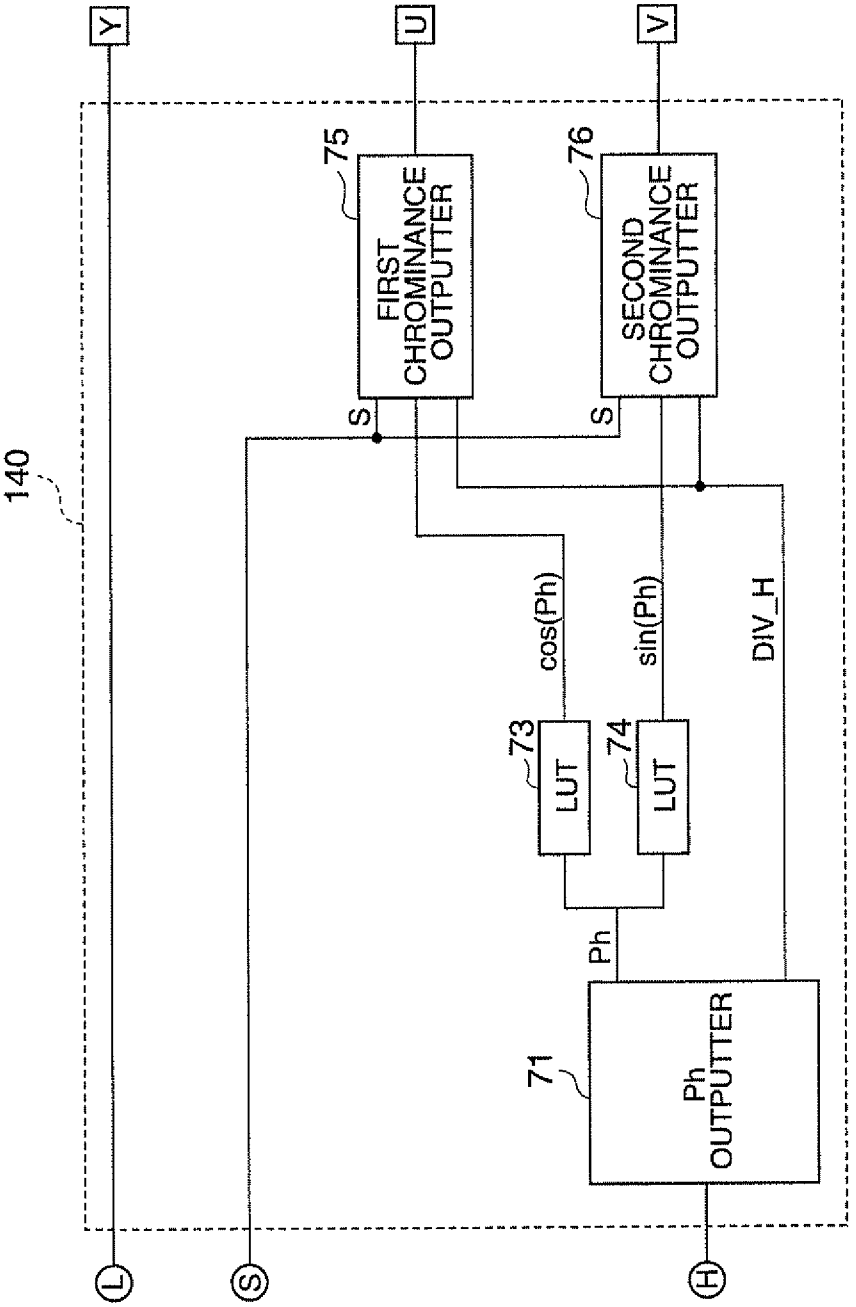
FIG. 12 is a block diagram showing a configuration of an inverse conversion circuit in the embodiment.

Specific configuration and operation of the inverse conversion circuit 140 will hereinafter be explained. As described above, the inverse conversion circuit 140 is a circuit for performing the HLS-YUV conversion on the HLS signals on which the user has performed the color adjustment and the color adjustment circuit 120 has performed the modification/correction process, and then outputting the YUV signals obtained by the conversion toward the liquid crystal light valve drive circuit 150. FIG. 12 is a block diagram showing a configuration of the inverse conversion circuit 140. As shown in the drawing, the inverse conversion circuit 140 is provided with a Ph outputter 71, an LUT 73, an LUT 74, a first chrominance outputter 75, and a second chrominance outputter 76. It should be noted that similarly to the color space conversion circuit 110, synchronous clock not shown is input to each of the calculation units to synchronize the operations between the circuits, wherein the synchronous clock signal is omitted from illustrations. Therefore, the HLS signals input to the inverse conversion circuit 140 are converted into the YUV signals corresponding to the group of signals using the synchronous clock, and are output in a synchronized manner.

Since the lightness signal (L) input to the inverse conversion circuit 140 corresponds one-to-one to the luminance signal (Y) in the coordinate space shown in FIG. 3 as described above, the lightness signal (L) is directly output as the luminance signal (Y).

The Ph outputter 71 obtains the hue angle Ph and the quadrant value DIV_H (the value corresponding to either one of the first through fourth quadrants) of the hue value H corresponding to the hue signal (H) on the U-V graph (FIG. 7). FIG. 13 is an explanatory diagram showing a calculation method for calculating the hue angle Ph and the quadrant value DIV_H in accordance with the hue value H input to the Ph outputter 71. The method for calculating the hue angle Ph is different depending on the level of the hue value H. As an example, when the hue value H is equal to 100 degrees, since the hue value H corresponds to the range of 90 through 180 degrees in FIG. 13, the calculation method of the hue angle Ph becomes Ph=180-H, and Ph=80 degree can be obtained. Further, in this case, the hue value H (=100 degrees) exists in the second quadrant in the U-V graph (FIG. 7), and is output as DIV_H=1. In the manner as described above, the hue angle Ph and the quadrant value DIV_H are output from the hue value H.

In FIG. 12, the signal corresponding to the hue angle Ph output from the Ph outputter 71 is input to the LUT 73 and the LUT 74. The LUT 73 is an LUT for outputting cos(Ph) as the cosine value of the hue angle Ph in accordance with the signal with the hue angle Ph input thereto. Further, the LUT 74 is an LUT for outputting sin(Ph) as the sine value of the hue angle Ph in accordance with the signal with the hue angle Ph input thereto. The signal corresponding to the hue angle Ph output from the Ph outputter is converted into the signal corresponding to cos(Ph) and sin(Ph) via the LUT 73 and the LUT 74, and is output toward the first chrominance outputter 75 and the second chrominance outputter 76.

As shown in FIG. 12, the first chrominance outputter 75 outputs the signal corresponding to the first chrominance value U based on the saturation value S, cos(Ph), and the quadrant value DIV_H. FIG. 14 is an explanatory diagram showing arithmetic expressions of calculation executed by a first chrominance outputter 75 in accordance with the value of the quadrant value DIV_H. The first chrominance outputter 75 selects the arithmetic expression for outputting the first chrominance value U based on the value (0 through 3) of the quadrant value DIV_H. Then, the first chrominance outputter 75 outputs the signal corresponding to the first chrominance value U based on the saturation value S input thereto and the cos(Ph) using the arithmetic expression selected in accordance with the quadrant value DIV_H.

The second chrominance outputter 76 outputs the signal corresponding to the second chrominance value V based on the signal corresponding to the saturation value S, sin(Ph), and the quadrant value DIV_H. FIG. 15 is an explanatory diagram showing arithmetic expressions of calculation executed by a second chrominance outputter 76 in accordance with the value of the quadrant value DIV_H. The second chrominance outputter 76 selects the arithmetic expression for outputting the second chrominance value V based on the value of the quadrant value DIV_H. Then, the second chrominance outputter 76 outputs the signal corresponding to the second chrominance value V based on the saturation value S and sin(Ph) using the arithmetic expression selected in accordance with the quadrant value DIV_H. In the manner as described above, the inverse conversion circuit 140 performs HLS-YUV conversion on the HLS signals input thereto to thereby output the YUV signals.

As explained hereinabove, the liquid crystal projector 100 performs the YUV-HLS conversion on the image signal of the YUV signals input thereto by the color space conversion circuit 110, and then outputs the HLS signals. Subsequently, in the color adjustment circuit 120, the image signal as the HLS signals are modified or corrected based on the instruction of the color adjustment from the user. In this case, since the color adjustment circuit 120 performs the modification/correction process on the image signal in the HLS signal state, the liquid crystal projector 100 can show the processing content thereof to the user as a color adjusting images expressing the processing content with the three elements of hue, lightness, and saturation, namely the Munsell color system. Further, the user can modify or correct the color adjustment of the image in each of the elements of hue, lightness, and saturation while checking the color adjusting images. Further, since in the present embodiment, the hue in the color adjusting images is expressed using six reference axes of blue (B), magenta (M), red (R), yellow (Y), green (G), and cyan (C), the user can easily perform the color adjustment of the image referring to the six hue points as an index of colors. In addition, since the liquid crystal projector 100 is provided with the color space conversion circuit 110 and the color adjustment instruction section 132 as hardware, the process can be executed fast, and it becomes possible to perform the conversion of the image signal input thereto into the HLS signals and the modification/correction process in real time.

B. Modified Examples

It should be noted that the invention is not limited to the specific examples and the embodiment described above, but can be put into practice in various forms within the scope or the spirit of the invention, and the following modifications, for example, are also possible.

B1. Modified Example 1

Although in the embodiment the HLS signals output by the color adjustment circuit 120 are converted by the inverse conversion circuit 140 into the YUV signals, the signal conversion performed by the inverse conversion circuit 140 is not limited to the signal conversion into the YUV signal, but can be conversion into other signal formats providing the signals are suitable for the image display. Further, if it is arranged that the liquid crystal projector 100 is provided with the circuit and processing section capable of displaying the image in the YUV signal format, the liquid crystal projector 100 can obtain substantially the same advantage as in the embodiment without being provided with the inverse conversion circuit 140.

B2. Modified Example 2

Although in the embodiment, the color adjusting images are presented to the user by the liquid crystal projector 100 projecting the color adjusting images on the screen 200, it is also possible to present the color adjusting images to the user by displaying the color adjusting images on the display screen of the computer connected to the liquid crystal projector 100.

B3. Modified Example 3

Although in the embodiment, it is arranged that the processing content performed by the color adjustment circuit 120 is shown on the display which can be viewed by the user as the color adjusting images, and the user performs the color adjustment of the projection image while checking the color adjusting image, it is also possible that the liquid crystal projector 100 is provided with a color adjusting operation panel expressed by hue, lightness, and saturation, namely the Munsell color system and adjusting dials for the respective hue points corresponding to blue (B), magenta (M), red (R), yellow (Y), green (G), and cyan (C) for color adjustment, instead of displaying the color adjusting images, and the color adjustment is performed while switching between the hue adjustment, lightness adjustment, and saturation adjustment using a switching button provided separately. Alternatively, it is also possible that the liquid crystal projector 100 is arranged to be provided with an operation function section for the color adjustment, and the user operating the operation function section to perform the color adjustment of the projection image while checking the projection image on the screen 200.

B4. Modified Example 4

Although in the embodiment, in the color adjusting images, the hue in the color adjusting images is expressed using the six reference axes of blue (B), magenta (M), red (R), yellow (Y), green (G), and cyan (C), the number of reference axes can be an arbitrary number such as 3, 4, or 8. Further, it is also possible to arrange that the user can arbitrary set the number of reference axes of the hue in the color adjusting images. Further, it is also possible to express the hue with continuous tone instead of providing the reference axes of the hue in the color adjusting images. Besides the above, it is also possible to arrange that the color adjusting images are presented to the user as images in which the Munsell color solid is expressed three-dimensionally, and the user directly operate the content of the modification/correction process expressed on the Munsell color solid using a mouse, a keyboard, and so on provided to the computer connected to the liquid crystal projector 100.

B5. Modified Example 5

Although in the embodiment, the liquid crystal projector 100 is described as an example of the image display device, the light modulation element is not limited to the liquid crystal light valve, but Digital Micromirror Device (DMD) can also be adopted as the light modulation element. It should be noted that DMD is a trademark owned by the Texas Instruments (United States). Further, the invention can be installed as a direct-view image display apparatus such as a plasma display or an organic EL display.

The entire disclosure of Japanese Patent Application No. 2009-75724, filed Mar. 26, 2009 is expressly incorporated by reference herein.

What is claimed is:

1. An image display apparatus adapted to display an image based on an image signal input, comprising:

a color adjustment circuit that performs one of a modification process and a correction process individually on a hue signal, a lightness signal, and a saturation signal included in first HLS signals as an image signal, and outputs the processed signals as second HLS signals; and a color adjustment instruction section that instructs a processing content of one of the modification process and the correction process performed by the color adjustment circuit, wherein the color adjustment instruction section includes a display control section that displays a color adjusting image showing the processing content of one of the modification process and the correction process performed by the color adjustment circuit on a display section visible to a user, the color adjusting image is an image expressing the processing content of one of the modification process and the correaction process with three images of a hue modifying image, a lightness correcting image, and a saturation correcting image, a number of reference axes for displaying the hue modifying image in the color adjusting image is set by the user, a color space conversion circuit adapted to convert first YUV signals composed of three signals of a luminance signal, a first chrominance signal, and a second chrominance signal included in the image signal input, into the first HLS signals composed of three signals of the hue signal, the lightness signal, and the saturation signal, wherein the color space conversion circuit is a circuit that converts the first YUV signals corresponding to three elements of the luminance, the first chrominance, and the second chrominance constituting a first color space of a three-dimensional Cartesian coordinate system into the first HLS signals corresponding to three elements of the lightness, the saturation, and the hue constituting a second color space of a three-dimensional polar coordinate system, and has a saturation calculation section, and a hue calculation section, the saturation calculation section includes a first multiplier that outputs a first multiplication value as a square value of the first chrominance, a second multiplier that outputs a second multiplication value as a square value of the second chrominance, an adder that outputs an addition value of the first multiplication value and the second multiplication value, and a square root extractor that outputs a square root value of the addition value as a signal corresponding to the saturation, and the hue calculation section is a circuit that outputs a signal corresponding to the hue based on a signal corresponding to the saturation and signals corresponding to the first chrominance and the second chrominance.

2. The image display apparatus according to claim 1, wherein at least one of the hue modifying image, the lightness correcting image, and the saturation correcting image expresses the processing content of one of the modification process and the correction process using blue, magenta, red, yellow, green, and cyan as references for representing the hue.

3. The image display apparatus according to claim 1, wherein the color adjustment instruction section further modifies the processing content of one of the modification process and the correction process performed by the color adjustment circuit in accordance with a modification instruction provided by the user of the processing content of one of the modification process and the correction process.

4. The image display apparatus according to claim 1 further comprising:

an inverse conversion circuit that converts second HLS signals into second YUV signals composed of three signals of a luminance signal, a first chrominance signal, and a second chrominance signal, and output the second YUV signals.

5. A method of controlling an image display apparatus, comprising:

receiving input of image signal;

converting first YUV signals composed of three signals of a luminance signal, a first chrominance signal, and a second chrominance signal included in the image signal input, into first HLS signals composed of three signals of a hue signal, a lightness signal, and a saturation signal;

performing one of a modification process and a correction process individually on the hue signal, the lightness signal, and the saturation signal included in the first HLS signals;

outputting the respective signals on which one of the modification process and the correction process is performed as second HLS signals;

instructing a processing content of one of the modification process and the correction process performed by the color adjustment circuit;

displaying a color adjusting image showing the processing content of one of the modification process and the correction process performed by the color adjustment circuit on a display section visible to a user;

converting first YUV signals composed of three signals of a luminance signal, a first chrominance signal, and a second chrominance signal included in the image signal utilizing a first color space of a three-dimensional Cartesian coordinate system into the first HLS signals composed of three signals of the hue signal, the lightness signal, and the saturation signal constituting a second color space of a three-dimensional polar coordinate system;

utilizing a saturation calculation section that includes a first multiplier to output a first multiplication value as a square value of the first chrominance, a second multiplier that outputs a second multiplication value as a square value of the second chrominance, an adder that outputs an addition value of the first multiplication value and the second multiplication value, and a square root extractor that outputs a square root value of the addition value as a signal corresponding to the saturation; and utilizing a hue calculation section that outputs a signal corresponding to the hue based on a signal corresponding to the saturation and signals corresponding to the first chrominance and the second chrominance, wherein the color adjusting image is an image expressing the processing content of one of the modification process and the correction process with three images of a hue modifying image, a lightness correcting image, and a saturation correcting image, and a number of reference axes for displaying the hue modifying image in the color adjusting image is set by the user.

* * * * *